Dec. 2, 1930. M. J. PETERSEN 1,783,670
TRAP
Filed Sept. 23, 1929
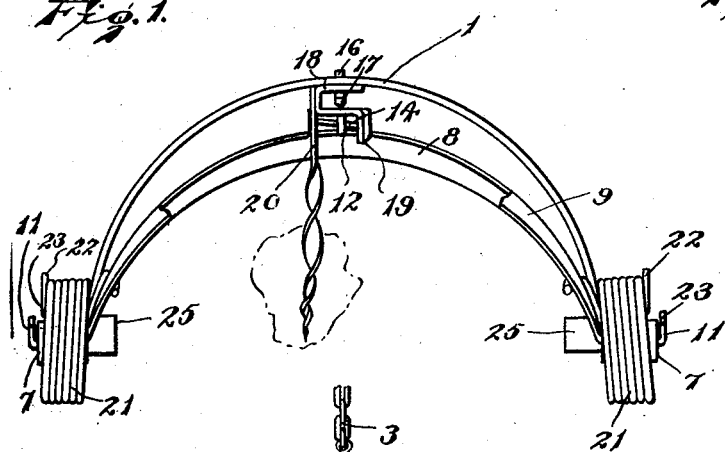
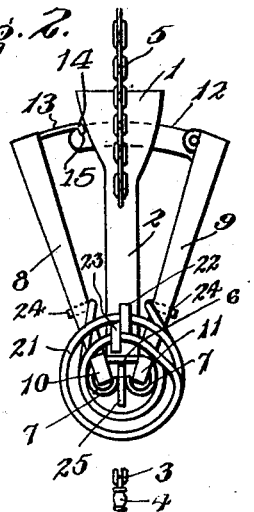
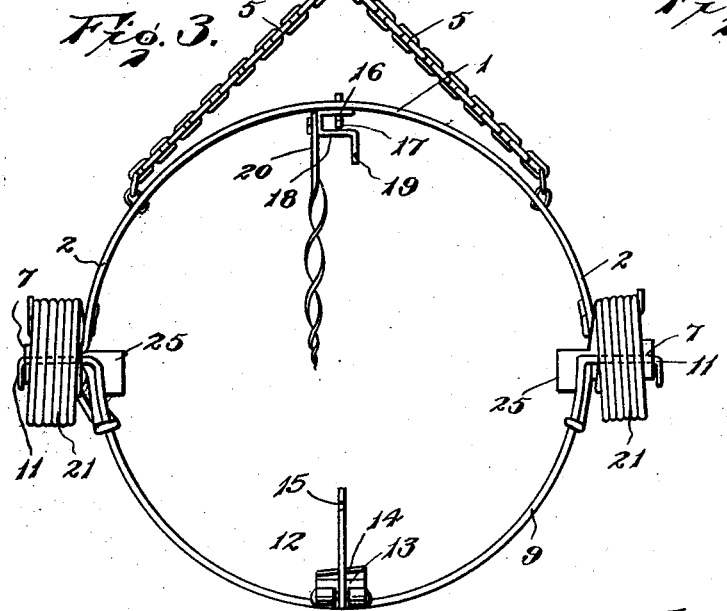
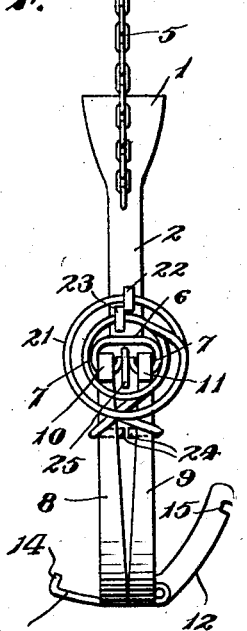
Inventor
M. J. Petersen
By Lacey & Lacey,
Attorneys Patented Dec. 2, 1930

1,783,670

UNITED STATES PATENT OFFICE

MARTIN J. PETERSEN, OF CANYON, MINNESOTA

TRAP

Application filed September 23, 1929. Serial No. 394,561.

This invention relates to fishing and trapping and more particularly to a trap of the type in which a portion of an animal will be gripped between jaws of the trap.

One object of the invention is to provide a trap of the spring jaw type so constructed that it may be suspended from a tree or other overhead support where it will be out of reach of small animals and also prevented from becoming inoperative due to snow or frozen ground.

Another object of the invention is to provide the trap with improved jaws and also with improved means for releasably holding the jaws open.

Another object of the invention is to provide a trap which is very efficient in operation and, at the same time, simple in construction.

The invention is illustrated in the accompanying drawing, wherein:

Figure 1 is a view in elevation showing the trap with the jaws open.

Figure 2 is a view looking from one side of Figure 1.

Figure 3 is a view similar to Figure 1, showing the jaws released and moved to a closed position.

Figure 4 is a view similar to Figure 2, looking at one side of Figure 3.

Figure 5 is a perspective view of a fragment of one arm of the body portion of the trap and illustrating the manner in which bearings for the jaws are formed.

Figure 6 is a perspective view of the keeper forming part of the trap.

This improved trap is adapted to be suspended from an overhead support such as the limb of a tree although it may be placed upon the ground if so desired, and includes a body portion 1 formed of metal and curved longitudinally in order to provide side arms 2 which are spaced from each other. A chain 3 is provided by means of which the trap may be suspended from a tree limb and at one end of the chain is provided a swivel 4 from which extends branch chains 5 secured to the body in spaced relation to the ends of the arms, as shown in Figures 2 and 3. At the free ends of the arms are formed tongues or side extensions 6 and these tongues have their ends rolled to form bearings 7. The jaws 8 and 9 which are formed of strong metal, are curved longitudinally and at their ends are bent to form pintles 10 and 11 which extend through the bearings and have their outer ends bent as shown clearly in Figures 1 and 3 of the drawing, so that the pintles will be prevented from moving out of the bearings and the jaws pivotally mounted for swinging movement from the closed position shown in Figures 3 and 4 to the open position shown in Figures 1 and 2. From an inspection of Figures 1 and 2, it will be seen that when the trap is suspended from a tree limb, the jaws will be so positioned that an animal of sufficient size can easily reach the bait and when the jaws are released they may swing downwardly and grip the animal about its head or neck.

In order to releasably secure the jaws in an open or set position, there has been provided a latch 12 which is pivotally mounted upon the jaw 9 in position to extend from one side thereof and the jaw 8 carries a keeper 13 which also projects transversely and has its free end bent to form a lip 14 for engagement in the notch or seat 15 of the latch. A stem 16 having a head 17 at its free end is carried by the body 1 between the arms 2 and upon this stem is loosely mounted a trigger 18. The trigger terminates in an abutment tongue 19 and to the trigger at the opposite side thereof from the abutment is secured a bait carrier 20 which is twisted so that it may be thrust into the bait with a twisting motion and the bait prevented from being easily removed from the bait holder. Therefore, an animal cannot secure the bait without moving the trigger. The latch 12 extends across the trigger between the bait holder and the lip 19 when the jaws are secured in an open position and when the bait holder and trigger are pulled downwardly by an animal attempting to eat the bait, the trigger will exert pressure against the latch and cause it to be moved out of engagement with the lip 14 of the keeper 13. Therefore, the jaws will be released and allowed to move to a closed position and grip the head or foot of an animal. The tongue 19 formed at the end of the trigger prevents it from moving out of operative relation to the latch. It should be noted that the lip 14 increases in depth toward one side so that by shifting the latch transversely its free end may be engaged with a deep or shallow side portion of the lip. By this arrangement the extent of pull necessary to release the latch from the keeper can be controlled.

In order to normally retain the jaws closed and cause them to return to a closed position when the latch is released, there has been provided coil springs 21 which are coiled about the bearings and engage with the two jaws at opposite sides of the trap. Referring to Figure 2 and 4, it will be seen that each spring consists of a strand of resilient wire which is coiled about a bearing and formed with inner and outer coils engaged with hooks 22 and 23 projecting from the side arms of the body. The ends of the strands are bent to form hooks 24 which engage the jaws and it will be understood that when the jaws are swung to an open position the springs will be tensioned and when the latch is released the springs will cause the jaws to be snapped shut and firmly grip the head or neck of an animal between them. Plates 25 are provided between the bearings 7 and project inwardly to extend between the jaws and limit their movement in a closing direction. I have, therefore, provided a trap of the spring jaw type which may be suspended in an elevated position out of the reach of small animals and which will be very effective in catching an animal of the proper size.

What is claimed is:

1. A trap comprising a body, jaws pivoted to said body and movable from a closed to an open position, a latch to releasably secure the jaws opened, a keeper having a flange for engagement by said latch increasing in depth toward one side, a trigger to move the latch to a releasing position including a bait holder, means to close the jaws when released, and means to suspend the body from a support with the jaws extending downwardly therefrom.

2. A trap comprising a body, a trigger carried by said body, jaws pivoted to said body and movable toward the body from a closed to an open position with the trigger between them when opened, a bait holder carried by said trigger and projecting therefrom between the jaws, a latch and cooperating keeper to releasably hold the jaws open, each latch being moved out of engagement with the keeper by the trigger to release the jaws when the trigger is moved downwardly, means to close the jaws when released, and means to support the body in an elevated position with the jaws beneath the same.

3. A trap comprising a body having extended side portions, a trigger loosely carried by said body intermediate its sides, jaws pivoted to the sides of said body and when opened extending toward the body at opposite sides of the trigger, a keeper carried by one jaw, a latch carried by the other jaw and extending across said trigger to engage said keeper when the jaws are open, a bait holder carried by said trigger and when moved adapted to shift the trigger into position to engage the latch and release the same from the keeper, and means to move the jaws to a closed position when released.

4. A trap comprising a body having extended side portions, a trigger loosely carried by said body intermediate its sides, jaws pivoted to the sides of said body and when opened extending toward the body at opposite sides of the trigger, a keeper extending from a side of one jaw, a latch pivoted to the other jaw and extending from a side thereto to extend across the trigger and engage said keeper when the jaws are open, a bait holder extending from said trigger between the jaws, said trigger having an abutment to engage the latch and move the same out of engagement with the keeper to release the jaws when the bait holder and trigger are moved by an animal, and means to move the jaws to a closed position when released.

5. A trap comprising a body having side arms, bearings at the ends of said arms, jaws between said arms pivoted at their ends in the bearings and movable toward the body from a closed to an open position, a trigger loosely connected with the body between said arms and disposed between the jaws when opened, a bait holder extending from said trigger, means to releasably secure the jaws open moved to release the jaws by said trigger, and means to close the jaws when released.

6. A trap comprising a body having side arms, bearings at the ends of said arms, jaws between said arms pivoted at their ends in the bearings and movable toward the body from a closed to an open position, a stem carried by said body between the arms, a trigger loosely mounted upon the stem and having an abutment lip, a bait holder extending from said trigger, a keeper carried by one jaw, a latch pivoted to the other jaw and adapted to extend across said trigger between the lip and bait holder and engage said keeper, and resilient means to close the jaws when released.

7. A trap comprising a body having side arms, bearings at the ends of said arms, jaws between said arms pivoted at their ends in the bearings and movable toward the body from a closed to an open position, a trigger loosely connected with the body between said arms and disposed between the jaws when opened, a bait holder extending from said trigger, means to releasably secure the jaws open moved to release the jaws by said trigger, springs disposed about said bearings and engaged with the jaws to close the jaws, and means to support the body.

8. A trap comprising a body having side arms, bearings at the ends of said arms, jaws between said arms pivoted at their ends in the bearings and movable toward the body from a closed to an open position, a trigger loosely connected with the body between said arms and disposed between the jaws when opened, a bait holder extending from said trigger, means to releasably secure the jaws open moved to release the jaws by said trigger, springs coiled about said bearings and engaged with the jaws to close the jaws, strips carried by said bearings and extending therefrom between the jaws to limit movement of the jaws in a closing direction, and means to suspend said body from a support with the jaws beneath the body.

In testimony whereof I affix my signature.

MARTIN J. PETERSEN. [L. S.]